United States Patent [19]

Schock

[11] Patent Number: 4,870,776
[45] Date of Patent: Oct. 3, 1989

[54] WEIGHT, ACTION, AND COLOR ADJUSTABLE FISHING LURE

[76] Inventor: Herold Schock, 509 - 825 Granville St., Vancouver, B.C., Canada, V6Z 1K9

[21] Appl. No.: 234,521

[22] Filed: Aug. 22, 1988

[51] Int. Cl.$^4$ ............................................. A01K 85/00
[52] U.S. Cl. ................... 43/42.33; 43/42.06; 43/42.09; 43/42.47
[58] Field of Search ............... 43/42.33, 42.06, 42.31, 43/42.32, 42.47, 42.09

[56] References Cited

U.S. PATENT DOCUMENTS

| | | | |
|---|---|---|---|
| 1,333,154 | 3/1920 | Buddle | 43/42.47 |
| 1,611,644 | 12/1926 | Johnson | 43/42.48 |
| 2,600,437 | 6/1952 | Siepe | 43/42.06 |
| 3,705,465 | 12/1972 | Charney | 43/42.33 |
| 3,768,195 | 10/1973 | Proietti | 43/42.33 |
| 3,973,351 | 8/1976 | Doiron | 43/42.06 |
| 3,987,575 | 10/1976 | Morita | 43/42.06 |
| 4,648,198 | 3/1987 | Sauve | 43/42.06 |

*Primary Examiner*—Gene P. Crosby

[57] ABSTRACT

A lure is provided that allows for a great variety of weights, action and appearance of the lure by interchangeable parts, saving the fisherman time, money, space and weight over buying and carrying a number of separate lure comparable to the permutations available with this lure. The lure has a transparent tube into which different weighted and attractive beads can be inserted after being threaded onto the fishing line. The lure tube has a protruding lip in which there are a number of holes. Threading the fishing line through particular holes governs the kind of action the lure will have when pulled by the line through the water.

7 Claims, 1 Drawing Sheet

WEIGHT, ACTION, AND COLOR ADJUSTABLE FISHING LURE

FIELD OF THE INVENTION

The present invention relates to fishing lures and in particular discloses a fishing lure that the fisherman can configure by adding or replacing different weights and attractive beads within a transparent lure shell.

DESCRIPTION OF THE PRIOR TECHNOLOGY

There are a number of fishing lures that are adapted to be changed by the fisherman to suit different fishing conditions. For example, some lures can be bent to give a particular action when retrieved through the water. Various fishing lure accessories also allow the fisherman to customize a lure. For example, reflective scale-pattern tape can be stuck onto a fishing spoon. The effective weight of a lure can be increased by attaching extra weight onto the fishing line adjacent to the lure. None of the prior technology discloses the features that comprise this invention.

SUMMARY OF THE PRESENT INVENTION

This invention provides a fishing lure device that combines the features of adjustability of weight, action, and appearance. The lure comprises a hollow tube to which a fishing line and a fish hook can attached. The tube is transparent and is adapted to hold a number of colored plastic beads and lead beads.

The device can be made as a kit, having a variety of such beads of different colors and weights.

The lure tube has a downwardly protruding lip on its front end, which acts as a deflector to make the lure dive and wobble in the water. The lip has a number of holes in it, through one of which the lure is threaded onto the fishing line. The line is then threaded back through a second hole in the tube and pulled out the back end of the tube. The selected beads are then threaded onto the line, and the hook is attached with a knot. Alternatively, a swivel can be placed between the beads and the hook. The tube slides back on the line until the beads come up against the second hole in the tube. It is in this configuration that the lure is retrieved through the water.

In the protruding lip, the hole chosen will control the movement of the lure in the water. If a lower hole is chosen the lure will not dive as deeply. If an upper hole is used, the lip will angle down more steeply, and the lure will tend to dive more steeply as it is retrieved. There are also holes on either side of the center of the lip to provide for the lure to plane or spin to one side or the other.

This device is suitable for use with a leader line from 5 to 50 lb. test rating. The leader length for drift fishing should be 3 to 4 feet. For spincasting and trolling the leader length should be 2 to 3 feet. For bait casting or spincasting the best action is achieved with a slow retrieve, either with or without a weight. In a stream or river, the line can be free-spooled to allow the lure to be carried downstream. When the lure is over a likely fish spot, the reel should be engaged, which will cause a lifelike darting minnow action of the lure. In trolling, the best action of the lure is achieved with a slow troll. The device can be used with a downrigger, three-way swivel, and lead sinker. Alternatively the lure can be trolled without any weight. The lure can also be jigged. A swivel or bead-chain at the front end of the leader should be used.

The fact that the fisherman can change the color and appearance of the lure and consequently its appeal to the fish by interchanging a variety of beads enables him to save money and space and weight in his tackle box over what would be the case if he carried a comparable variety of non-adjustable lures. The interchangeability of the parts of the lure avoids the alternatives of messy painting or sticky tapes in customizing a lure.

The means of weight-adjustability of the lure is an advantage over the alternative of having the weight separate from the lure on the fishing line. When the weight is right in the lure, casting is easier and more precise, and there is less debris caught on the line as it is pulled through the water. The arrangement of having the weights threaded onto the line and retained there by the transparent case of the lure also has the advantage of not crimping the line or requiring additional knots, as is ordinarily the case in the attachment of weights to a fishing line.

The action-adjustability of the lure allows it to be made to roll, wiggle, spin, and jerk back and forth to imitate a crippled minnow or young fish. Studies have also shown that game fish are more likely to be fooled by an imitation of their main foods where the action of the imitating lure is confusing, such that the fish cannot discern the deception. The device of this invention is a highly effective lure because its confusing action does not allow a fish the opportunity to make out the fact that it is not really an edible food.

The device can also be used in conjunction with real and artificial non-action baits and lures to make them more lively.

DETAILED DESCRIPTION

Figure 1:
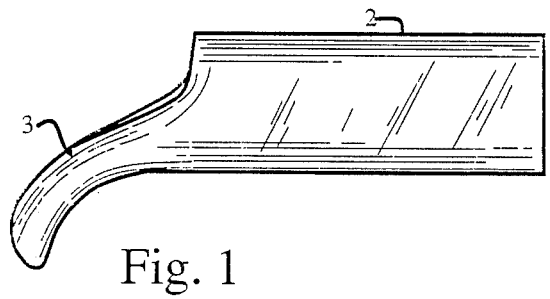
FIG. 1 is a side view of the lure tube of a preferred embodiment of this invention.

Referring to FIG. 1, the transparent tube 2 is shown. Its protruding lip 3 has a downward planing effect when the lure is pulled through the water.

Figure 2:
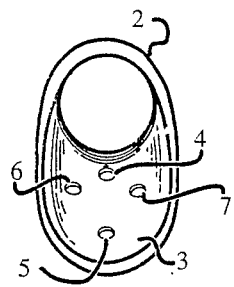
FIG. 2 is a front end view of the device of FIG. 1.

Referring to FIG. 2, a number of holes are found in the protruding lip 3 of the tube 2. Hole 4 is used for the fishing line to the fisherman's rod when a deep planing and erratic action is desired. Hole 5 is used when a shallower planning and slower action is desired. Hole 6 is used instead if a spinning action is desired. Hole 7 can alternatively be used for the line to the rod, and will result in a spinning in the opposite direction.

Figure 3:
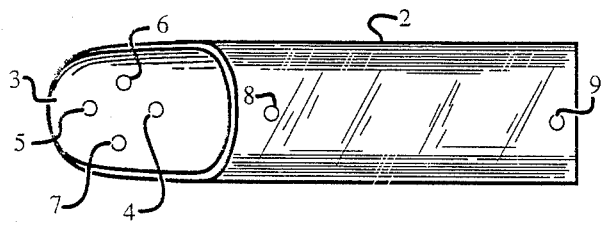
FIG. 3 is a top view of the device of FIG. 1.

Referring to FIG. 3, holes 4, 5, 6, and 7 are again shown on the protruding lip 3, and holes 8 and 9 through the bottom of the tube can be seen through the top of the transparent tube 2.

Figure 4:
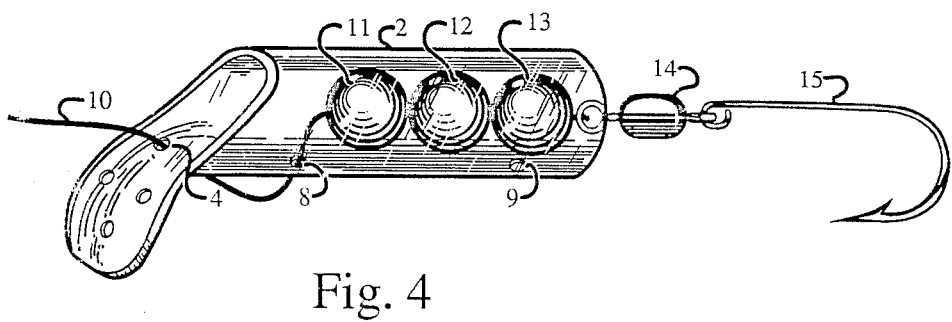
FIG. 4 is a perspective view of a preferred embodiment of this invention.

Referring to FIG. 4, the fishing line 10 to the fisherman's rod passes through hole 4, for a deep planing and erratic action by the lure. The line 10 is then threaded back through hole 8 into the interior of the tube 2. Beads 11, 12, and 13 are threaded onto the line and then a swivel 14 and a hook 15 are attached. A pulling force from the fisherman's rod draws the beads up in the lure until bead 11 abuts hole 8. The bead is too large to pass through hole 8, and the lure is therefore pulled along through the water. A lower hook could be rigged on a line threaded through hole 9 instead of or in addition to the line 10 exiting the tube 2 through the back end of the tube.

The within-described invention may be embodied in other specific forms and with additional options and accessories without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. A fishing lure comprising a tube with at least one hole in the wall of the main body thereof and having a protruding lip with at least one hole therein, the said holes adapted to be threaded by a fishing line, and the tube adapted to receive at least one colored bead or like object that has been threaded onto the fishing line.

2. The lure of claim 1, in which the tube is made of substantially transparent material.

3. The lure of claim 1, comprising in addition at least one colored bead or like object, threaded onto a fishing line and retained thereby within the tube.

4. The lure of claim 1, in combination with a variety of attractive beads and weights adapted to be threaded onto a fishing line and to be received within the tube.

5. The lure of claim 1, in which the protruding lip has a fore hole and an aft hole, each adapted to be threaded by a fishing line.

6. The lure of claim 1, in which the protruding lip has a left hole and a right hole, each adapted to be threaded by a fishing line.

7. The lure of claim 8, in which the tube is made of substantially transparent material and comprising in addition a variety of attractive beads and weights adapted to be threaded onto a fishing line and to be received within the tube, and in which the protruding lip has a fore hole, an aft hole, a left hole and a right hole, each adapted to be threaded by a fishing line.

* * * * *